United States Patent [19]

Baxter

[11] Patent Number: 5,365,885
[45] Date of Patent: Nov. 22, 1994

[54] DROP STALL

[75] Inventor: Seaton Baxter, Banchory, Scotland

[73] Assignee: Aco Severin Ahlmann GmbH & Co. KG, Rendsburg, Germany

[21] Appl. No.: 12,738

[22] Filed: Feb. 3, 1993

[30] Foreign Application Priority Data

Feb. 5, 1992 [GB] United Kingdom ............... 9202462.9

[51] Int. Cl.⁵ .................................................. A01K 1/02
[52] U.S. Cl. .................................................. 119/27; 119/63
[58] Field of Search .................... 119/20, 27, 62, 63

[56] References Cited

U.S. PATENT DOCUMENTS

| 1,209,688 | 12/1916 | Drew | 119/27 |
| 1,337,926 | 4/1900 | Lewis | 119/27 |
| 1,447,562 | 3/1903 | Mattson et al. | 119/63 |
| 3,782,332 | 1/1974 | Depenthal et al. | 119/51.13 |
| 4,129,096 | 12/1978 | Wickel | 119/27 |
| 4,513,687 | 4/1985 | De Jong | 119/63 |

FOREIGN PATENT DOCUMENTS

| 020636 | 9/1990 | European Pat. Off. | |
| 0220086 | 3/1985 | German Dem. Rep. | 119/20 |
| 2706120 | 12/1978 | Germany | 119/20 |
| 2738765 | 3/1979 | Germany | 119/20 |
| 2841037 | 4/1980 | Germany | 119/20 |
| 3011445 | 10/1981 | Germany | 119/27 |
| 1287798 | 2/1987 | U.S.S.R. | 119/27 |

*Primary Examiner*—Gene Mancene
*Assistant Examiner*—Todd E. Manahan
*Attorney, Agent, or Firm*—Rosen, Dainow & Jacobs

[57] ABSTRACT

A stall for an animal comprises a substantially closed frame for surrounding the animal while feeding and a pivot arrangement for allowing the frame to be lifted out of the way when not in use. The stall is provided with a trough pivotally mounted on a support whereby the trough opening moves between positions which are accessible and inaccessible to the animal as the stall is moved from the use to the out of use positions.

17 Claims, 5 Drawing Sheets

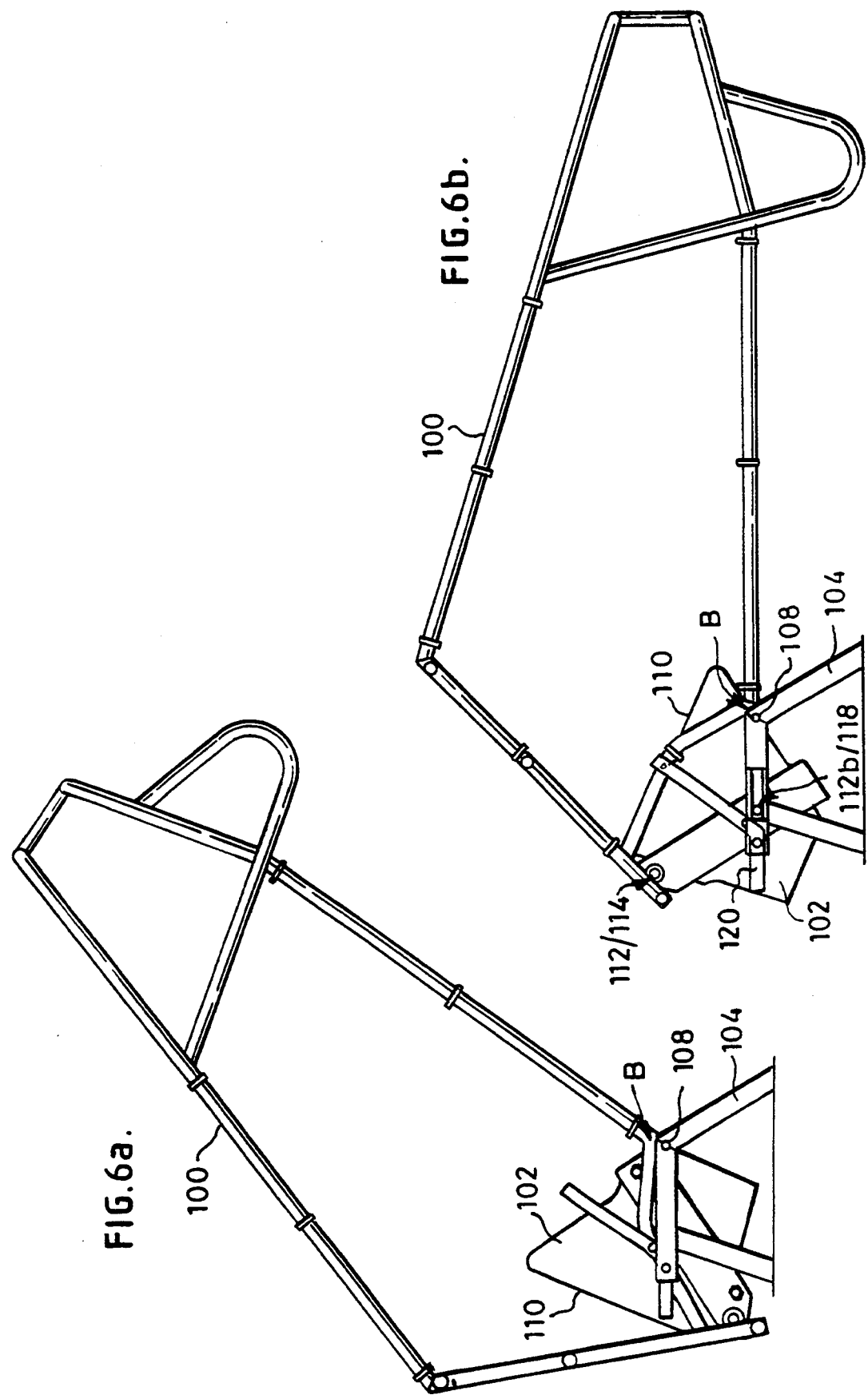

DROP STALL

BACKGROUND OF THE INVENTION

1. Field of the Invention

The present invention relates to a feeding stall for restraining animals whilst feeding.

Feeding stalls are used for controlling animals when they are feeding side-by-side from, for example, a trough.

2. Description of the Related Art

One known stall comprises a pair of upright grids respectively positioned either side of the feeding animal and a rear gate which is liftable to allow the animal to enter or leave the device. The front of the apparatus may be closed by another grid or by a feed dispenser. Using a plurality of such stalls, several beasts may be positioned side by side for feeding. The stalls effectively prevent aggressive behaviour between the animals.

The aforementioned known apparatus takes up a significant amount of space which therefore cannot be used for the animals to rest together or to move about freely. Also, because the animals cannot turn around in the restraint, when the rear gate is lifted, they have to back out. This tends to make the animals fractious.

SUMMARY OF THE INVENTION

The present invention provides an apparatus which overcomes these drawbacks. Thus, according to the present invention there is provided a stall for an animal comprising a substantially closed frame for surrounding the animal whilst feeding and pivot means allowing the frame to be lifted out of the way when not in use.

The pivot means may, for example, comprise a pivot and means for attaching the pivot to an existing structure such as a wall of a barn. However, preferably it comprises a support on which a pivot is mounted. In a preferred embodiment the support is attached to a trough.

The trough may be coupled to the support and the stall via linkage means configured for causing the trough to move from a feed position, when the drop stall is surrounding the animal, to a position which allows convenient access for refilling or cleaning by the stockman, that is when the drop stall is in the raised position. The convenient access position is preferably such that the trough opening is directed away from the animal thereby preventing the animal from seeing the feed when the stall is raised.

The linkage means may comprise a main pivot for providing a pivot point between a forward part of the stall and the trough, and a sliding pivot for allowing the trough to pivot and slide relative to the support. The main pivot and the sliding pivot cooperate with each other so as to cause the trough to move through a large angular displacement when the stall is lifted to the raised position.

In the preferred embodiments, the frame comprises a single closed unit most preferably of substantially cylindrical rod-like cross section. At the sides, the frame is dimensioned so that when in the feeding position, the sides are of sufficient height to retain the body of the animal. The distance between the sides is such as to prevent the animals from turning. Moreover, the rear of the frame is raised above the height of the sides when in the use position, in order to prevent the animal from stepping out backwards. The front portion is also raised to prevent the animal from stepping out sideways. The frame is preferably pivoted at or towards its front.

Preferably, the front of the frame is provided with a shield portion. Whilst this may be transparent, it is preferred that it should be translucent or opaque to prevent adjacent animals from seeing each other, in order to minimise aggression.

The stall of the present invention may be used for feeding any animal but will be dimensioned for the intended species, e.g. pigs, sheep, cattle, horses etc.

BRIEF DESCRIPTION OF THE DRAWINGS

The present invention will now be explained in more detail by way of example with reference to the accompanying drawings, in which:

FIG. 6a is side view of a feeding stall similar to the one illustrated in FIG. 5 when in the raised position; and FIG. 6b is a side view of the feeding stall of FIG. 6a when in the lowered position.

DESCRIPTION OF PREFERRED EMBODIMENTS

Figure 1:
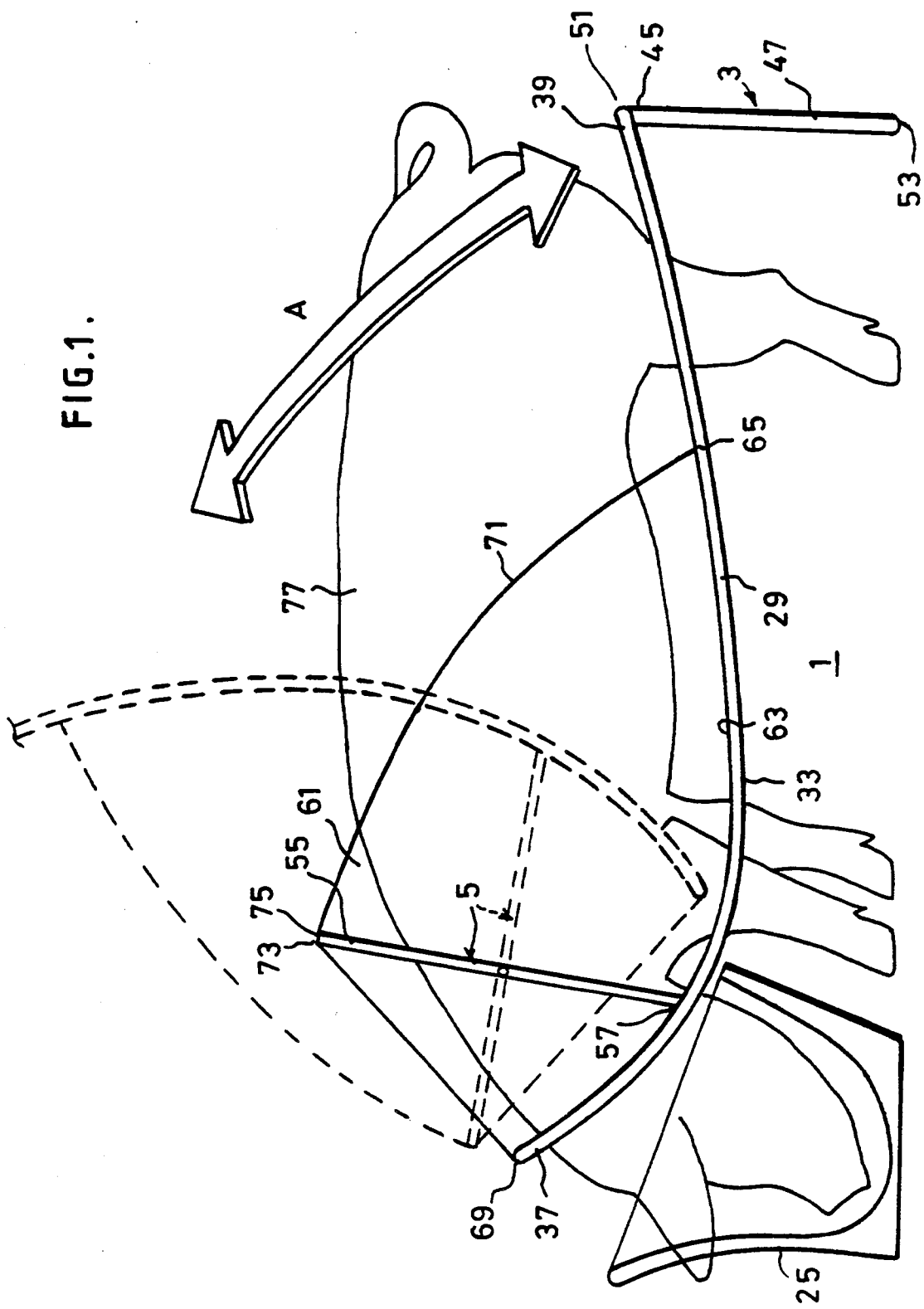
FIG. 1 shows a side view of a feeding stall according to a first embodiment of the present invention.
Figure 2:
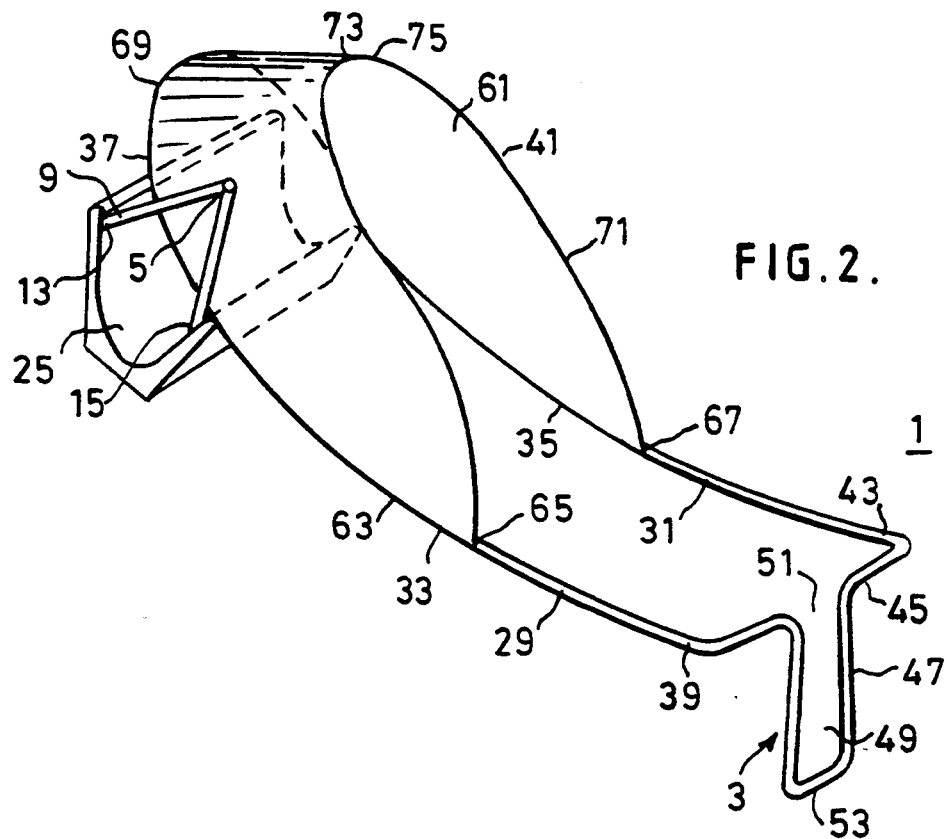
FIG. 2 shows a perspective view of the stall shown in FIG. 1.
Figure 3:
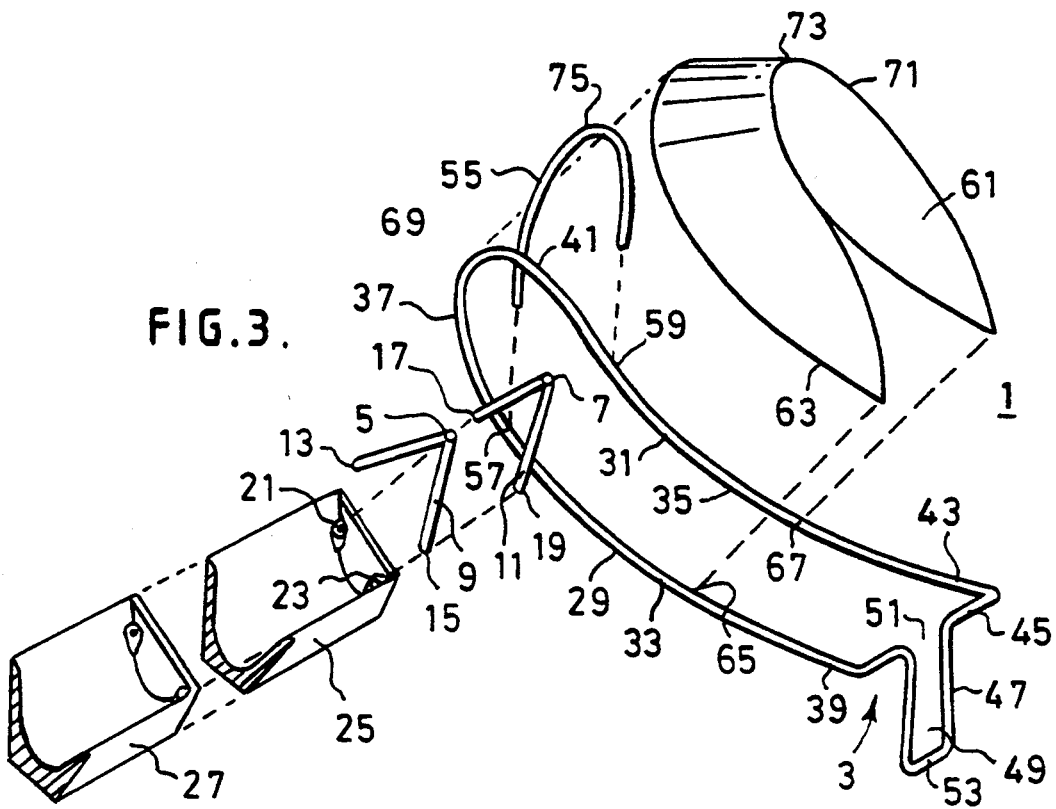
FIG. 3 shows an exploded diagram of the stall shown in FIGS. 1 and 2.

Referring to FIGS. 1 to 3 of the drawings there is shown a feeding stall 1 for pregnant sows according to first embodiment. The stall comprises a closed contoured frame 3 of substantially cylindrical cross section supported on a pair of pivots 5, 7. The pivots are mounted at respective apexes of a pair of supports 9, 11.

Free ends 13, 15 and 17, 19 of the supports locate in sockets 21, 23 etc of a feeding trough 25. There may be provided a plurality of troughs 25, 27 etc located adjacent to each other for attachment to respective stalls, side-by-side.

The frame 3 comprises a pair of curving sides 29, 31 the middles 33, 35 of which are nearer the ground than their respective ends 37, 39 and 41, 43 when the apparatus is in the use position for feeding.

The rear 45 of the frame is raised at the height of the rear ends 39, 43 of the sides but has a downwardly depending portion 47 defining a substantially slot shaped aperture 49 open at the top 51 but bounded at the bottom 53.

An upstanding arched member 55 is connected to tile frame at respective points 57, 59 towards the front thereof. A curved shield 61 is attached to the frame upstanding therefrom, with its lower edge 63 extending between respective points 65, 67, which are located towards the rear of the frame, around the curved front part 69 of the frame. The upper edge 71 of the shield also extends from the two points 65, 67 but its uppermost centre part 73 is attached to the highest part 75 of the arched member 55.

Referring specifically to FIG. 1, the frame with its attached shield hinges about the pivots 5, 7 between a lower use position (solid line) and a raised position (broken line), as indicated by the arrow A (the supports 9, 11 are omitted in FIG. 1 for reasons of clarity).

In the raised position, the ground beneath is uncovered, enabling the sows room for free movement or sleeping. In use, the frame is lowered to surround the sow 77 whilst it feeds from the trough. The frame prevents the sow from escaping from the feeding position. In this position, when the sow's head is raised it cannot see the animal in an adjacent stall because the screen is opaque.

Figure 4:
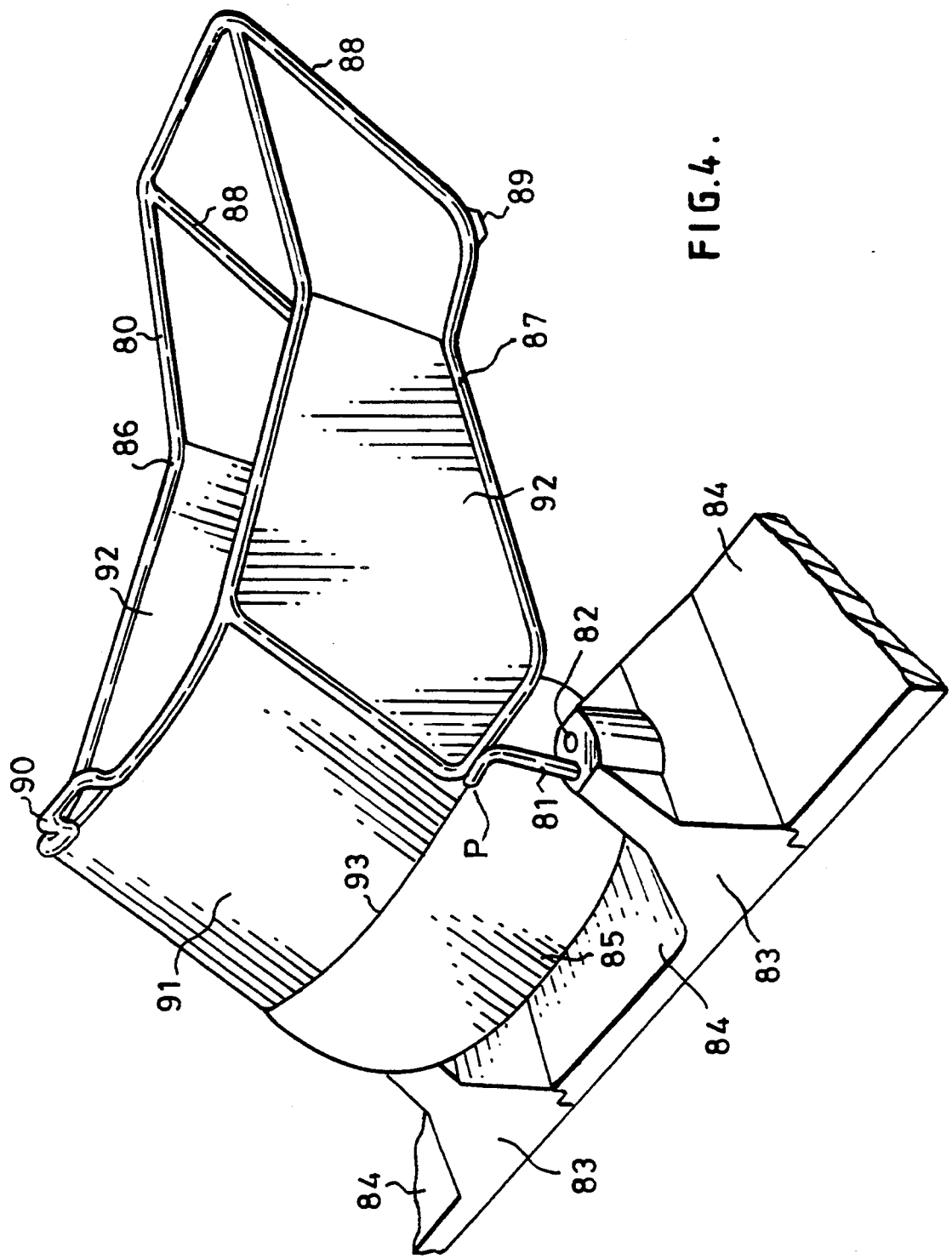
FIG. 4 shows a perspective view of a feeding stall according to a second embodiment of the invention.

FIG. 4 illustrates a second embodiment of the invention. This second embodiment adopts similar operating principles as the first embodiment but is different in constructional detail.

The second embodiment comprises a closed frame 80 of, for example, tubular steel pivotally supported on supports 81 positioned on either side of the frame. Only one of the supports 81 can be seen in the perspective view of FIG. 4. Each one of the supports 81 is mounted in a respective one of a pair of mounting holes 82 formed in braced supports 83 of a modular base 84. In this embodiment, it is necessary to place a pair of modular bases 84 side-by-side in order to provide a pair of adjacent braced supports for respectively receiving respective supports 81 of the closed frame 80. The modular bases 84, which may be formed from polymer concrete, facilitate easy assembly of the feeding stall onto an irregular floor. More modular bases 84 may be placed side-by-side in order to provide for additional feeding stalls, the number depending on the particular requirements.

The points of contact between the steel frame 80 and the supports 81 form the pivot points which are dropped towards ground level in comparison with the first embodiment. This allows the pivot points to join the main structure of the stall at a junction between a trough 85 and the frame 80. The trough 85 can be bolted on to the steelwork of the closed frame 80.

The trough 85 may also be formed of polymer concrete. The polymer concrete trough can be joined to the steelwork of the closed frame 80 in the vicinity of the pivot points, one of which is denoted by the reference letter P.

The closed frame 80 has sides of upper and lower bars 86, 87 which provide a rigid structure for resisting excessive lateral movement of the animal within the stall.

The rear of the stall comprises a double leg configuration 88 which joins the lower legs 87 at a point which contacts the ground when the stall is in use. A damper foot 89 may be provided.

A handle 90 is provided at the front of the frame 80 to facilitate raising and lowering of the stall.

A curved front panel 91 and side panels 92 are provided and are preferably formed from an opaque material to act as a screen to prevent animals in adjacent stalls from seeing one another. A lower edge 93 of the front panel 91 is located in a recess within the trough for preventing food leaking from the trough whilst being filled.

Figure 5:
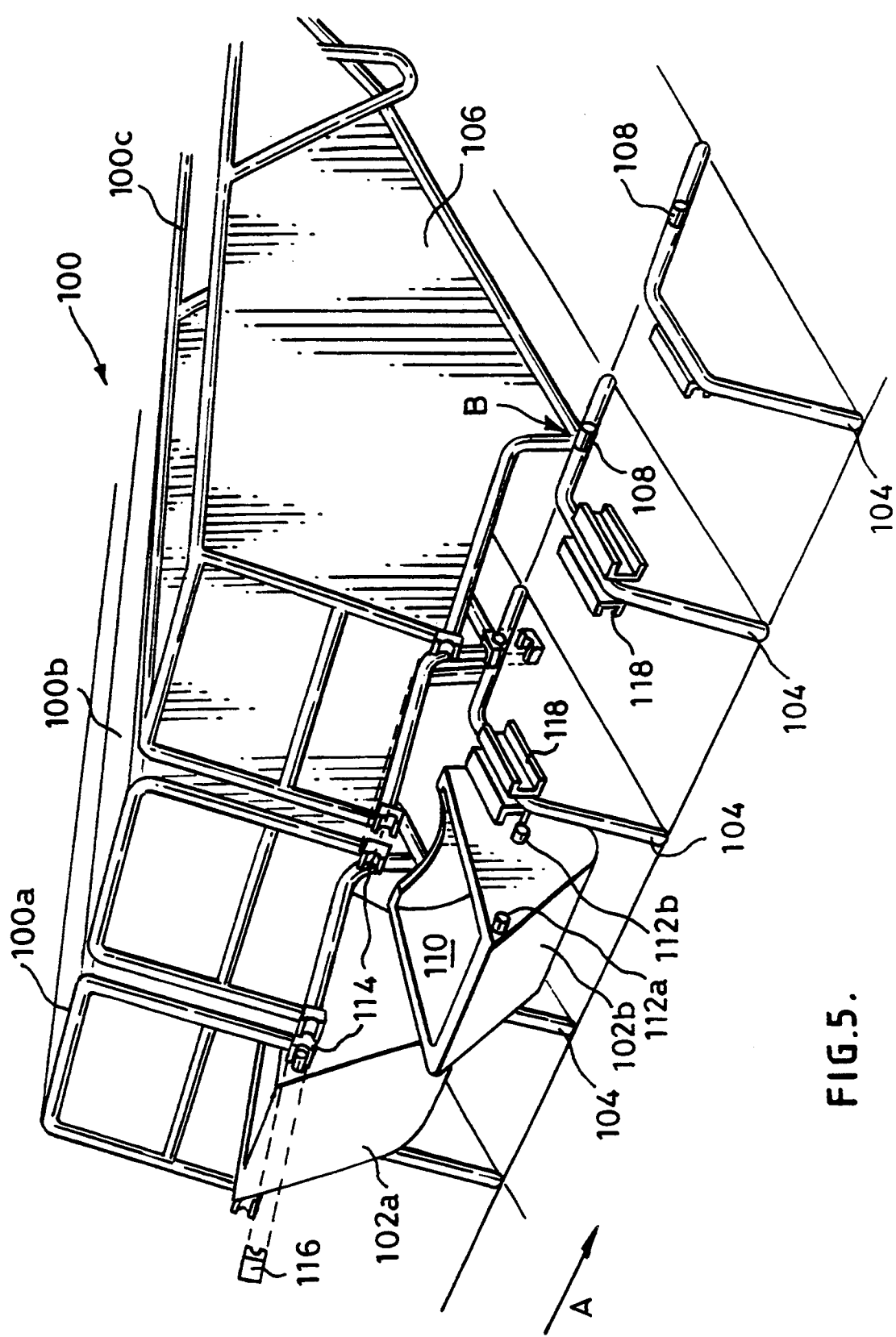
FIG. 5 is a perspective view of three feeding stalls placed side by side in which the trough is coupled to the stall with linkage means according to a third embodiment of the present invention.

FIG. 5 shows a stall 100 according to a third embodiment of the invention; three stalls 100a, 100b, 100c being shown side by side with the trough 102a being illustrated in the animal accessible position. The trough 102b is shown detached from supports 104 and the stall 100b to aid understanding of the embodiment. The trough is missing from the third stall 100c in order to aid illustration of the linkage between the trough and the stall and support. The pair of supports 104 towards the bottom right of FIG. 5 are shown without a stall so that the location of the stall pivot points can be seen more easily.

The stalls are generally configured as in previous embodiments, the stalls 100 each have side walls made from tubular material and an opaque screen 106 for preventing animals from seeing their neighbour. In this embodiment, the stalls are arranged in a line in front of a feed alley A along which a stockman can gain access to the troughs. The troughs 102a, 102b are linked to the supports and stalls so that the animal can access the trough when the stall is in the lowered position (as is the case with the stall 100a), but is prevented from seeing the feed in the trough and gaining access to the trough when the stall is in the raised position (see FIG. 6a).

Each stall 100 is pivotally supported (at the point designated by arrow B in FIGS. 5 and 6) on a pair of stall pivots 108 provided on the supports 104. These pivot points permit the stall to be lifted and lowered as desired as described in the earlier embodiments. This pivot might permit an angular swing of about 55 degrees for the stall.

Each trough is provided with an access opening 110 in to which the animal can insert its head in order to gain access to the feed. Both sides of the trough are provided with a forward stub shaft 112a which cooperates with a bush 114 provided in the front end of the stall. A cover 116 is provided for securing the forward spigot 112a in the bush 114. Both sides of the trough are also provided with a central stub shaft 112b, each central spigot 112b being constrained to slide within a respective channel 118 provided on the supports 104. Given that only pivotal movement is possible between the stall 100 and the supports 104 (i.e. no lateral movement is possible), and similarly between the forward stub shaft 112a and the bush 114, the central stub shaft will remain within the channel 118 provided it is sufficiently long. However, the ends of the channels may be blocked off if required.

FIGS. 6a and 6b show the stall of FIG. 5 in the raised and lowered positions respectively. In FIG. 6a, it can be seen that the access opening 110 of the trough is displaced so that it faces away from the animal and towards the feed alley. In FIG. 6b, the stall is in the lowered position and so the access opening 110 is conveniently accessible to the animal. The relative positioning of the stub shafts and the main stall pivot is such that the trough can rotate through an angle of 75 degrees or so when the stall moves from one position to the other.

Although not shown in detail, a locking device 120 may be provided for securing the stall in the raised and/or lowered position.

I claim:

1. A stall for an animal comprising a frame shaped to surround the animal while feeding and pivot means for allowing the frame to be lifted out of the way when not in use, said pivot means comprising a support on which a pivot is mounted, and a trough coupled to said support, said trough having a feed opening and being coupled to the support and the stall via linkage means configured to allow the feed opening of the trough to move between a position where the trough is accessible to the animal when the stall is surrounding the animal, and a position where the trough is inaccessible to the animal when the stall is lifted out of the way of the animal when the stall is not in use.

2. A stall according to claim 1, comprising means for attaching the pivot means to an existing structure.

3. A stall according to claim 1, wherein the frame is dimensioned specifically for one of the following species: pigs, sheep, cattle, horses.

4. A stall according to claim 1 wherein the support comprises a pair of members disposed on respective sides of the stall.

5. A stall according to claim 4, wherein the support is mounted on a modular base for permitting any desired number of stalls to be positioned adjacent to one another.

6. A stall according to claim 5, wherein adjacent modular bases are configured to interlock with one another.

7. A stall according to claim 1, wherein the frame has a front that is raised to prevent the animal from stepping out of the frame.

8. A stall according to claim 1, wherein the frame has a front and is pivotable at or towards said front, said front being defined by the locations of a trough from which the animal can feed.

9. A stall according to claim 1, wherein the linkage means comprises a main pivot for providing a pivot point between a forward part of the stall and the trough, and a sliding pivot for allowing the trough to pivot and slide relative to the support whereby the opening of the trough is angularly displaced as the stall is moved between positions.

10. A stall according to claim 1, wherein the frame comprises a single closed unit formed from substantially rod-like members.

11. A stall according to claim 1, wherein the frame comprises side members of strength sufficient for restricting lateral movement of the animal.

12. A stall according to claim 1, wherein the frame has sides that are spaced apart by a distance sufficiently small to prevent the animal within the stall from turning.

13. A stall according to claim 1, wherein the frame has a rear that is disposed at a height sufficient to prevent the animal from stepping out backwards from the stall.

14. A stall according to claim 1, wherein the frame has a front and at least the front of the frame is provided with a shield portion.

15. A stall according to claim 14, wherein the shield portion is translucent for preventing adjacent animals from seeing one another.

16. A stall according to claim 16, wherein the shield portion is opaque for preventing adjacent animals from seeing one another.

17. A stall for an animal comprising a frame having first and second spaced apart sides, each having a front end and a rear end, front end means joining said front ends of said first and second sides and rear end means joining said rear ends of said first and second sides to define a enclosed space adapted to surround said animal, means for pivoting said frame about a horizontal axis between a first position wherein said enclosed space is surrounded by said frame to inhibit entry or removal of said animal from said space and a second position at which said rear end means is pivoted upward to permit said animal to enter and leave said space, said pivot means including a support on which a pivot is mounted, a trough coupled to said support, said trough having a feed opening, and a linkage coupling said trough to the frame to move the feed opening of the trough between a position at which the trough is accessible to the animal when the frame is pivoted to said first position, and a position at which the trough is inaccessible to the animal when the frame is pivoted to said second position.

* * * * *